United States Patent
Atnoor et al.

(10) Patent No.: US 6,328,896 B1
(45) Date of Patent: Dec. 11, 2001

(54) PROCESS FOR REMOVING STRONG OXIDIZING AGENTS FROM LIQUIDS

(75) Inventors: Devendra Atnoor, Lowell; Gary Ganzi, Lexington; Jonathan Wood, Needham; Gary Zoccolante, Plymouth, all of MA (US)

(73) Assignee: United States Filter Corporation, Palm Desert, CA (US)

( * ) Notice: Subject to any disclaimer, the term of this patent is extended or adjusted under 35 U.S.C. 154(b) by 0 days.

(21) Appl. No.: 09/066,239

(22) Filed: Apr. 24, 1998

(51) Int. Cl.$^7$ ........................................................ B01D 1/32
(52) U.S. Cl. ........................ 210/669; 748/900; 204/158.2
(58) Field of Search ................................. 210/900, 639, 210/652, 195.1, 195.2, 257.2, 757, 748, 754, 663, 669; 204/158.2

(56) References Cited

U.S. PATENT DOCUMENTS

| | | |
|---|---|---|
| 4,280,912 | 7/1981 | Berry, III et al. . |
| 4,595,498 * | 6/1986 | Cohen et al. . |
| 4,642,192 | 2/1987 | Heskett . |
| 5,122,274 | 6/1992 | Heskett . |
| 5,135,654 | 8/1992 | Heskett . |
| 5,198,118 | 3/1993 | Heskett . |
| 5,234,606 | 8/1993 | Kazama et al. . |
| 5,316,637 * | 5/1994 | Ganzi et al. ................. 210/182.4 |
| 5,433,856 * | 7/1995 | Heskett ........................... 210/638 |
| 5,571,419 * | 11/1996 | Obata et al. ..................... 210/664 |
| 5,585,003 | 12/1996 | Van Newenhizen . |
| 5,603,844 | 2/1997 | Murphy et al. . |
| 5,766,479 | 6/1998 | Collentro et al. . |
| 5,833,846 * | 11/1998 | Tanabe et al. ................... 210/202 |
| 5,997,745 | 12/1999 | Tonelli et al. . |

FOREIGN PATENT DOCUMENTS

WO 98/52874  11/1998  (WO) .

OTHER PUBLICATIONS

Kemmer, Frank N. (editor). The Nalco Water Handbook, 2nd ed. McGraw–Hill Book Company, p. 17.7, Dec. 1988.*
Rodriguez, Jesse et al., "Disinfection: Liquid Purification by UV Radiation, and its Many Applications," Ultrapure Water, Sep., 1991.
International Search Report PCT/US99/08301, dated Oct. 20, 1999.
"Ultraviolet Light Oxides Free Chlorine in Water" http://www . . . /article.asp?DocID={EBA4610F–5998–11D3–9A5F–00A0C9C83AFB}&Bucket=Feature.
Monochloramine Removal by Granular Activated Carbon, Contemporary Dialysis and Nephrology, Mar. 1988, Kitty K. Siu et al.

(List continued on next page.)

Primary Examiner—Ana Fortuna
Assistant Examiner—Richard W. Ward
(74) Attorney, Agent, or Firm—Wolf, Greenfield & Sacks, P.C.

(57) ABSTRACT

An apparatus and process for removing strong oxidizing agents from liquids. An exemplary embodiment of the apparatus includes an inlet for receiving an input stream having a first concentration of a strong oxidizing agent. The input stream flows into an irradiation unit in fluid communication with the inlet. While resident in the irradiation unit, the input stream is irradiated with UV radiation to substantially reduce the first concentration, thereby forming a first product stream having a second concentration of the strong oxidizing agent. The first product stream then passes through a treatment unit in fluid communication with and positioned downstream of the irradiation unit where the second concentration is substantially reduced, thereby forming a second product stream having a third concentration of the strong oxidizing agent. The treatment unit is selected from the group consisting of a softener unit, a reaction vessel containing a bed of metal redox media, and combinations thereof. The second product stream exits the apparatus through an outlet and passes to a point of use.

18 Claims, 3 Drawing Sheets

OTHER PUBLICATIONS

KDF Process Media, pp. 1–5.

Mastering the Science of Dechlorination, Water Technology, Mar. 1995, Dr. Lars Guenter Beholz KDF 55 Redox Alloy Removes Chlorine to Extend the Life of Granular Activated Carbon, KDF Fluid Treatment, Inc.

Water Dechlorination by Activated Carbon, Ultraviolet Radiation and Sodium Sulphite, Water Res., vol. 17, No. 6, pp. 667–676, 1983, M.A. Giles and R. Danell.

Ultraviolet Dechlorination of Beverage Water, Coca–Cola, USA,1988 Ted A. Barber & Brannon H. Wilder.

UV Makes its Mark for Dechlorination, Water Technology, May 1988, Marc J. Scanlon.

Chlorine Removal, Ultrapure Water, Apr. 1998, Richard Combs and Norman Ammerer.

Dechlorination of Water Using Ultraviolet Light, 10–26 MIT Lab Course, Professor Clark K. Colton, Chem.

\* cited by examiner

PROCESS FOR REMOVING STRONG OXIDIZING AGENTS FROM LIQUIDS

BACKGROUND OF THE INVENTION

1. Field of the Invention

The present invention relates to an apparatus and process for removing strong oxidizing agents from liquids and, more particularly, to an apparatus and process for substantially reducing chlorine concentration in water.

2. Description of the Related Art

High purity water is required in many manufacturing and analytical applications in, for example, the chemical industry, the foodstuffs industry, the electronics industry, medical industry, and the pharmaceutical industry. These applications typically require treatment of a source water supply (such as a municipal drinking water supply) to reduce the levels of contaminants. Treatment processes and systems typically include combinations of: distillation, filtration, ion exchange (including electrodeionization), reverse osmosis (RO), photo oxidation, ozonation, and ultrafiltration.

In an effort to decrease biological contaminants in municipal water supplies, especially in warmer environments, the addition of chlorine has become commonplace. As used herein, the term "chlorine" can include various chlorine containing compounds, such as chloramines, chlorine dioxide, chlorite, chlorate, perchlorate, and the like. While effective as a biocide, chlorine becomes a contaminant itself in certain applications which are environmentally sensitive or require high purity water. Furthermore, it is widely known in the art that strong oxidizing agents, such as chlorine, have a deleterious effect on certain thin film membranes, such as those used in RO units, as well as on ion exchange resins. In this regard, municipal water supplies typically contain chlorine concentrations (e.g., approximately 1 ppm) that are unacceptable for these sensitive applications. Other strong oxidizing agents often found in municipal water supplies include percarbonate, perborate, peracetate, bromine, iodine, peroxide, and ozone. Any of these agents can be a contaminant in a given application.

In the medical industry, for example, purified water is used in various applications, such as for dialysis. Water for dialysis is typically produced by anion exchange using, for example, an electrodeionization unit to remove ionized contaminants from the water. As noted, strong oxidizing agents, such as chlorine, are known to have a deleterious effect on anion exchange resins. Chlorine, in particular, can react with anion exchange resins to form nitrosamines, a group of carcinogenic compounds which are known to cause cancer in a number of organs, including the liver and kidneys.

Nuclear and fossil-fuel power plants also have stringent water quality requirements to reduce corrosion and scaling and the associated expensive downtimes. In pressurized water reactor nuclear plants, for example, high-purity water is important in reducing corrosion in steam generators. In boiling water reactor nuclear plants, high-purity water is important in maintaining water quality in the nuclear reactor. Traditionally, makeup water treatment systems for power plants have relied almost exclusively on various combinations of filtration, ion-exchange, and reverse osmosis, with the latter two being especially sensitive to strong oxidizing agents.

Similarly, In the pharmaceutical industry, various degrees of purified water are used in drug manufacture, injection of drugs, irrigation, and inhalation. The United States Pharmacopoeia (USP) lists standards for the various types of water used in the pharmaceutical industry, including purified water, sterile purified water, water for injection, sterile water for injection, sterile bacteriostatic water for injection, sterile water for irrigation, and sterile water for inhalation. The prescribed source water for pharmaceutical grade waters is "drinking water" as defined by Environmental Protection Agency regulations.

Purified water can be used to process certain drugs, particularly as a cleaning agent for equipment and in the preparation of certain bulk pharmaceuticals. Purified water is produced from drinking water by pretreatment equipment followed by ion exchange, and/or RO, and/or distillation.

Sterile purified water is not used in any drug that will be introduced directly into the bloodstream. Purified water is made sterile by heating it to a minimum temperature of 121° C. for at least 15 minutes. Water for injection can be introduced directly into a patient's bloodstream and, therefore, must meet all purified water standards and endotoxin limits. In the processing of water for injection, a RO or distillation unit must be used.

Sterile water for injection can be used to dilute drugs which will be introduced into the bloodstream. Sterile water for injection is packaged in volumes not larger than 1 liter and is made sterile by the process noted above. Sterile bacteriostatic water for injection is similar to sterile water for injection including antimicrobial agents, and is packaged in volumes not larger than 30 milliliters. Sterile water for irrigation is used during surgical procedures to flush tissue within the body. Sterile water for inhalation is similar to sterile water for injection that is used in inhalers and in the preparation of inhalation solutions.

Figure 1:
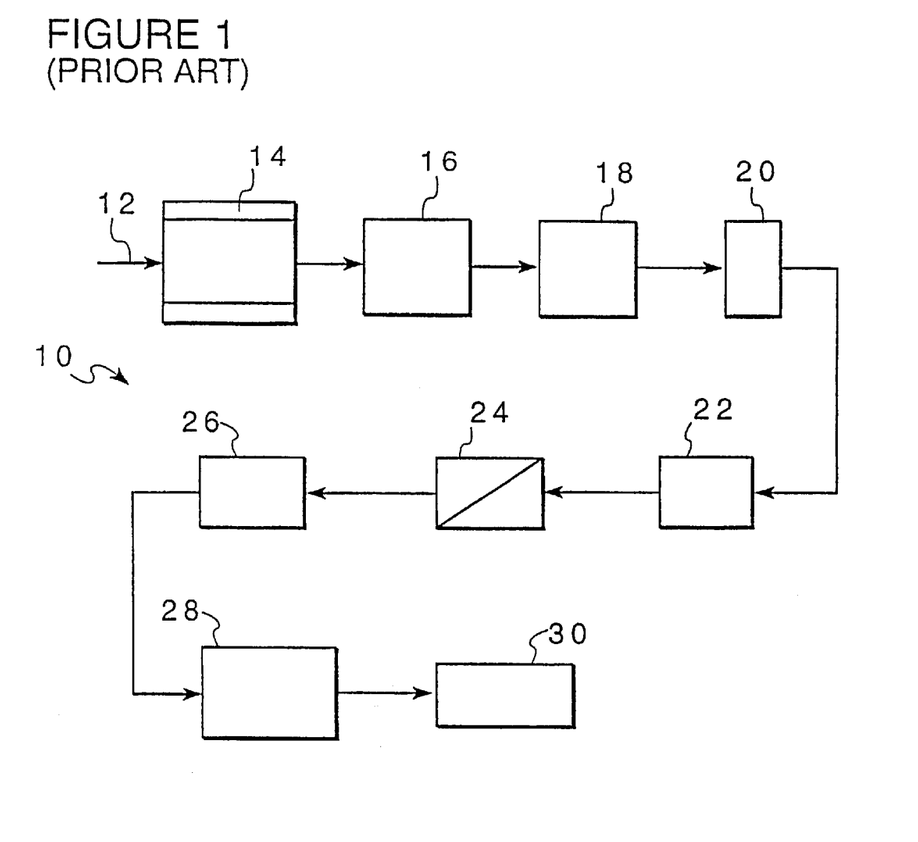
FIG. 1 is a schematic process flow diagram of a conventional prior art water treatment system for high purity applications.

FIG. 1 illustrates a schematic process flow diagram of a typical prior art water treatment system 10 for producing purified water for various applications. As shown, feedwater, typically municipal drinking water, is fed through line 12 to a multimedia filter unit 14 to remove bulk particulate material. The water is then passed through a water softener 16, most typically an ion exchange unit, to remove scale-forming cations such as calcium and magnesium. In addition, water softener 16 serves to remove divalent and trivalent cations and reduce the tendency for coagulation of colloids that could foul downstream RO membranes. The water is then passed through a heat exchanger 18, which is typically used in system 10 if the source water is from a surface water source such as a lake or river.

The water is passed from heat exchanger 18, if used, to a dechlorination unit 20 that can include an activated carbon bed to reduce the chlorine concentration, which, as noted above, is typically present in the municipal drinking water that serves as the source water for the system. After dechlorination, the water is passed to a cartridge filtration unit 22, which provides a final filtration to protect the RO membranes from fouling or other damage caused by relatively large particles generated from upstream equipment. The water is then passed to an RO unit 24, which removes nearly all of the particulate material from the feedwater. Typically, greater than 98 percent of dissolved substances are rejected by the RO membrane. Although not shown, a double-pass configuration of RO units can be used to achieve high quality purified water.

Optionally, the permeate from the RO unit(s) can be passed to a distillation unit 26 for the production of water for injection. A storage tank 28 may also be provided to store the distilled water prior to its use in production and/or packaging in unit 30. In alternative applications, such as used in the power industry or the electronics industry for example, Other water treatment units may be substituted for distillation unit 26. Suitable substitutions may include, for example, ion exchange units and the like.

As noted above, municipal drinking water is often chlorinated to control pathogenic microorganisms. Two treatment methods that are commonly used for chlorine removal are granulated activated carbon (GAC), and the direct injection of reducing agents such as sodium dioxide, sodium sulfite, sodium bisulfite, sodium metabisulfite, or other $SO^{2-}$-bearing chemicals. Other strong, scale-forming oxidizing agents can be removed by injection of various compounds. The type and concentration of the compounds necessarily depend on the type and concentration of oxidizing agent present and can include ascorbic acid, hydrazine, carbohydrazide, morpholine, and the like.

For RO pretreatment, dechlorination units containing a GAC bed are known to effectively reduce aqueous chlorine concentrations by the following reactions:

and

Unfortunately, however, chlorine reacts with GAC to form carbon monoxide and carbon dioxide, thereby depleting the media. GAC also tends to adsorb microorganisms and other contaminants on its surface. The adsorbed contaminants in a GAC bed eventually occlude catalytic sites, thereby reducing the bed's useful life. When this occurs, the exhausted media must be replaced and may require special handling. Additionally, the surface of GAC provides a favorable site for subsequent microbial growth, which may be unacceptable in biologically sensitive applications.

The direct injection of reducing agents into a process stream for removal of strong oxidizing agents is typically limited to applications that do not require a potable product. Although effective, this method has many disadvantages, including chemical cost, handling, storage, and the inconvenience and cost associated with metering and monitoring equipment. Sodium metabisulfite, in particular, can break down to form sodium sulfate, which stimulates sulfate reducing bacteria. Furthermore, the bulk removal of strong oxidizing agents by oxidation/reduction (redox) reactions introduces unwanted ionic and other species into the process stream, which may contribute to scaling of RO membranes.

Other, more recent, developments for chlorine removal include the use of flow-through reaction vessels containing metal redox media. However, because of the spontaneous redox reactions that take place in the reaction vessel, this dechlorination method can provide some of the same problems associated with sulfite addition. Specifically, when chlorine concentrations are moderate to high (i.e., approaching 1 ppm or more), the metal redox media can introduce unacceptably high levels of metal ions into the process stream, resulting in problems for downstream equipment.

Ultraviolet (UV) irradiation has been successfully used to reduce the levels of active microorganisms and organic compounds in water treatment systems. In particular, irradiation with UV light in the 185–254 nm wavelength range has been shown to be an effective germicidal (bacteriocidal and bacteriostatic) treatment for water. The adsorption of UV light by the DNA and proteins in the microbial cell results in the inactivation of the microorganism. A combination of lamps producing UV radiation in both the 185 nm and 254 nm ranges has also been shown to be effective in photooxidating organic compounds.

Recently, preliminary work has focused on UV dechlorination, which would have several inherent advantages over conventional dechlorination methods. Besides energy, UV radiation does not add anything to the treatment stream, such as undesirable chemicals and attendant color, odor, taste, and the like, nor does it generate harmful byproducts. UV irradiation would also provide beneficial side effects such as disinfection, total organic carbon (TOC) reduction, and ozone ($O_3$) destruction. One such study entitled "Ultraviolet Dechlorination of Beverage Water," published in *The Society of Soft Drink Technologists*, pp. 71–94, (1988) and carried out by Coca-Cola USA, was directed to UV dechlorination of trace amounts of residual chlorine downstream of a GAC filter. The results show that uneconomically high UV dosage requirements clearly favor treatment of trace levels of free chlorine and chloramines rather than use of this technique as a primary means of dechlorination. In this regard, the raw data showed that a residence time of 10 to 50 times that necessary for disinfection was necessary to remove trace amounts of chlorine (i.e., 0.10 to 0.24 ppm). Even more telling are the results of a "real world" test that more accurately emulated the irradiation unit's effect on raw municipal drinking water (i.e., $[Cl_2]$=approximately 1 ppm). From an economic standpoint, the flowrates needed for the essentially complete chlorine removal necessary for RO pretreatment were unsatisfactory (i.e., less than $3.43 \times 10^{-2}$ gpm).

The results of another study were published in the April, 1998 Edition of *ULTRAPURE WATER* in an article entitled "CHLORINE REMOVAL—ULTRAVIOLET LIGHT OXIDATION OF CHLORINE IN WATER." This study was directed to the feasibility of using commercially available UV units for dechlorinating process water. Based in part on results showing that UV could economically remove trace amounts of chlorine, the authors concluded that free chlorine levels around 1.0 ppm may be impractical and unrealistic for UV oxidation, and that GAC and chemical injection will continue to be the primary means of dechlorination.

As government regulations become more stringent and the demand for high purity water continues to grow, new and improved methods of treating municipal water to obtain high purity water are needed. To date, there is no efficacious and economically acceptable treatment method that removes moderate to high concentrations of strong oxidizing agents from municipal water supplies without introducing corresponding moderate to high concentrations of other contaminates into the treatment stream.

SUMMARY OF THE INVENTION

Accordingly, the present invention is directed to an apparatus and process for removing strong oxidizing agents from liquids. The apparatus and process of the present invention substantially reduce concentration of strong oxidizing agents in feedwater without expensive metering equipment, chemicals, and nearly constant monitoring required for sulfite injection. Dechlorination, for example, can be accomplished without granulated activated carbon, which provide sites for substantial bacteria growth. Furthermore, the invention removes strong oxidizing agents without introducing heavy metal ions and compounds into the product stream.

The apparatus includes an inlet for receiving an input stream having a first concentration of a strong oxidizing agent. The input stream flows into an irradiation unit in fluid communication with the inlet. While resident in the irradiation unit, the input stream is irradiated with UV radiation to substantially reduce the first concentration, thereby forming a first product stream having a second concentration of the strong oxidizing agent. The first product stream then passes through a treatment unit in fluid communication with, and positioned downstream of, the irradiation unit where the second concentration is substantially reduced, thereby forming a second product stream having a third concentration of the strong oxidizing agent. The second product stream exits the apparatus through an outlet and passes to a point of use, such as an RO unit or other process equipment, a storage vessel, or the like.

In various embodiments, the downstream treatment unit is chosen from the group consisting of a softener unit, a reaction vessel containing a bed of metal redox media, and combinations thereof. If a softener unit is present, it can contain ion exchange resin in sodium form. If a bed of metal redox media is present, it can comprise metallic particles formed of zinc, copper, or alloys of zinc and copper such as brass. These metallic particles have a redox potential which differs significantly from the redox potential of the strong oxidizing agent. Consequently, when the liquid is in contact with the particles, conditions are established for spontaneous inorganic oxidation and reduction reactions between the strong oxidizing agent and the particles.

Preferably, the input stream is resident in the irradiation unit for a period of time less than about 20 times the period of time theoretically necessary for disinfection of microorganisms (i.e., the disinfection rate). In other applications, economic considerations may require the residence time in the irradiation unit to be about 10 times the disinfection rate, or less. The unique configuration of the present invention allows substantially complete removal of strong oxidizing agents at these higher flowrates.

In many applications, the input stream will be obtained from a municipal drinking water supply, which typically contains about 1 ppm chlorine. The apparatus of the present invention is capable of reducing this chlorine concentration to less than about 0.05 ppm, which will minimize deleterious effects for particular applications, or in downstream equipment such as RO membranes and the like. In certain preferred embodiments, the present invention is capable of reducing the chlorine concentration to less than about 0.02 ppm, which will further increase the useful life of downstream RO membranes.

The present invention further provides a process for substantially reducing a concentration of a strong oxidizing agent in a liquid. An input stream having a first concentration of the strong oxidizing agent is irradiated with UV radiation to substantially reduce the first concentration, thereby forming a first product stream having a second concentration of the strong oxidizing agent. The first product stream is then passed through a treatment unit chosen from the group consisting of a softener unit, a reaction vessel containing a bed of metal redox media, and combinations thereof to substantially reduce the second concentration, thereby forming a second product stream having a third concentration of the strong oxidizing agent. The second product stream can then be directed to a point of use.

The present invention is further directed to a water treatment system having an inlet for receiving an input stream with a first chlorine concentration. The system also includes an irradiation unit capable of emitting UV radiation to substantially reduce the first chlorine concentration, thus forming a first product stream having a second chlorine concentration. A treatment unit in fluid communication with, and positioned downstream of, the irradiation unit substantially reduces the second chlorine concentration, thereby forming a second product stream having a third chlorine concentration. The treatment unit is chosen from the group consisting of a softener unit, a reaction vessel containing a bed of metal redox media, and combinations thereof. Finally, an RO unit in fluid communication with and positioned downstream of the treatment unit removes unwanted contaminants from the second product stream before it exits through an outlet to a point of use.

Other objects and features of the present invention will become apparent from the detailed description when read in light of the attached drawings. It is to be understood that these drawings are for the purpose of illustration only and are not intended as a definition of the limits of the invention.

BRIEF DESCRIPTION OF THE DRAWINGS

The foregoing and other objects and advantages will be more fully appreciated from the following drawings in which.

DETAILED DESCRIPTION OF THE INVENTION

Figure 2A:
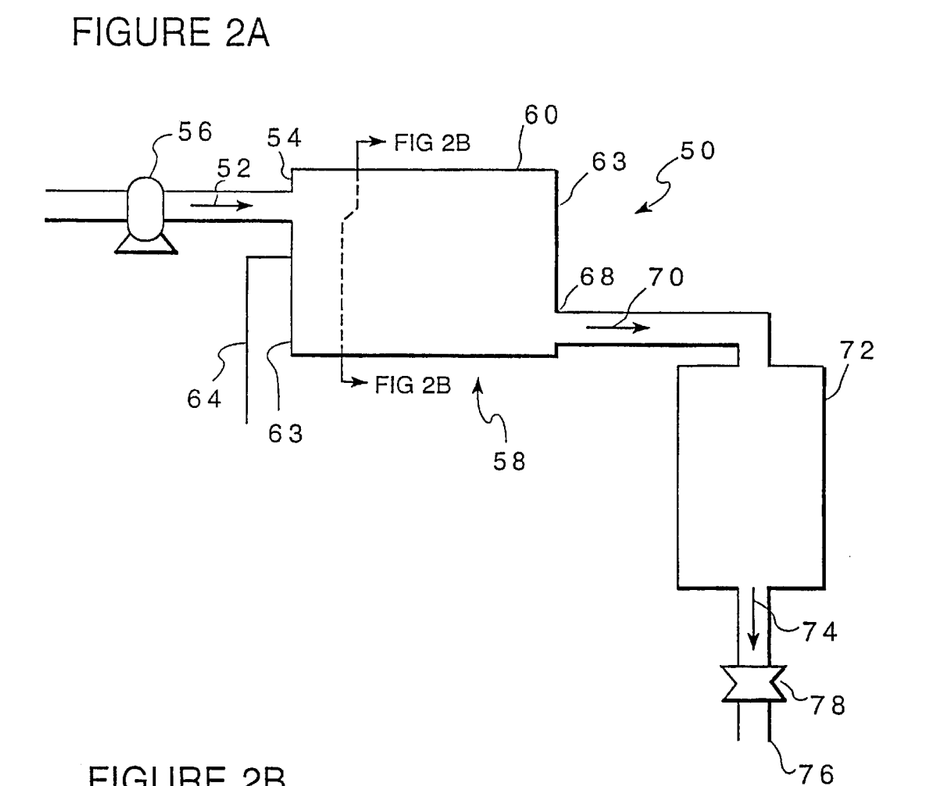
FIG. 2A is a schematic process flow diagram of an apparatus for removing strong oxidizing agents according to one embodiment of the present invention.

The present invention is directed to an apparatus and process for removing strong oxidizing agents from liquids. As shown in FIG. 2A, one embodiment of the present invention includes an apparatus 50 into which an input/feedwater stream (denoted by arrow 52) is introduced through an inlet 54. Depending on the source of input stream 52, an inlet pump 56 may be required to provide pressure within apparatus 50. Input stream 52 typically originates from a municipal water supply, but can also originate from a subterranean or surface water supply, or from precipitation collection. Municipalities currently chlorinate their water supplies to a concentration of approximately 1.0 ppm or higher to control pathogenic microorganisms. However, if input stream 52 is obtained from a municipal water supply, the actual chlorine concentration may vary slightly from this original concentration due to the chlorine's reaction with various contaminants in the municipal water system. For example, certain organic contaminants can combine with chlorine to form trihalomethanes, thereby reducing the concentration of "free" chlorine in the water. Input stream 52 may also contain other strong oxidizing agents, such as percarbonates, perborates, peracetates, bromine, iodine, peroxides, and ozone.

Figure 2B:
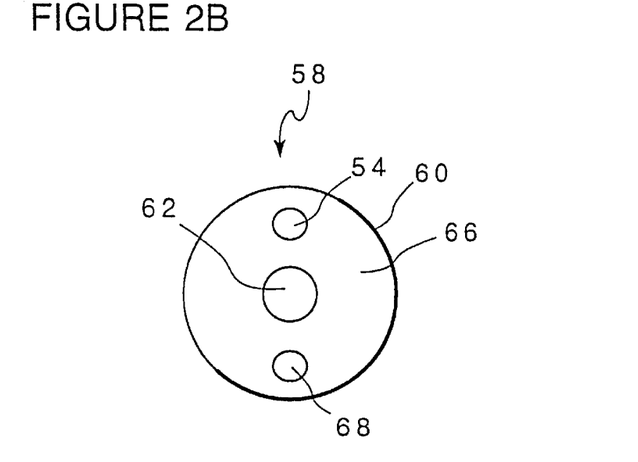
FIG. 2B is a cross-sectional view of an irradiation unit 58 shown in FIG. 2A, taken along section line 2B—2B.

Input stream 52 flows into an irradiation unit 58 that is in fluid communication with inlet 54. With reference to FIG. 2A and FIG. 2B, which is a cross-sectional view of irradiation unit 58 taken along section line 2B—2B of FIG. 2A, a typical irradiation unit comprises a cylindrical vessel 60 having a cylindrical UV lamp 62 disposed lengthwise along the centerline and parallel to the walls of vessel 60. UV lamp 62 is secured to circular ends 63 of cylindrical vessel 60 and is provided with cable/wiring 64 which leads to a power supply (not shown). The inside circumferential surface of vessel 60 along with the outside circumferential surface of UV lamp 62 define an irradiation chamber 66. Inlet 54 and an outlet 68 are located at opposite ends of vessel 60, and are off-set from the center of the ends 63. This configuration allows liquid to flow into irradiation chamber 66 and surround the outer circumference of UV lamp 62, such that, in operation, UV lamp 62 is capable irradiating a large volume of liquid resident in irradiation chamber 66.

Input stream 52 will have a first concentration of a strong oxidizing agent as it enters irradiation unit 58. Input stream 52 is irradiated with UV radiation in irradiation unit 58 to substantially reduce the first concentration, thereby forming a first product stream 70, having a second concentration of the strong oxidizing agent. First product stream 70 passes through a treatment unit 72, in fluid communication with and positioned downstream of irradiation unit 58, wherein the second concentration is substantially reduced, thereby forming a second product stream 74, having a third concentration of the strong oxidizing agent. Second product stream 74 exits apparatus 50 through an outlet 76 and passes to a point of use, a further process treatment, or to a storage vessel. Because second product stream 74 is substantially free of strong oxidizing agents as it exits apparatus 50, further process treatment can be readily accomplished with, for example, an RO unit or an electrodeionization unit.

Without limiting the present invention to a particular theory, it is believed that chlorine undergoes hydrolysis in an aqueous medium to form "free chlorine" (hypochlorous acid, HOCl, and hypochlorite, OCl⁻) through the following reactions:

$$Cl_2 + H_2O \leftrightarrows HOCl + H^+ + Cl^- \quad (1)$$

$$HOCl \leftrightarrows H^+ + OCl^- \quad (2)$$

Furthermore, it is believed that photolysis by UV irradiation removes free chlorine by the following free radical mechanism:

$$HOCl + H_2O^{irv} \rightarrow H^+ + Cl^- + 2.OH (\text{free radical}) \quad (3)$$

$$Cl^- + H_2O \rightarrow HCl + .OH \quad (4)$$

$$.O + H_2O \rightarrow 2.OH \quad (5)$$

$$O^- + H_2O \rightarrow .OH + OH^- \quad (6)$$

As known to those skilled in the liquid purification art, the useful life of conventional RO membranes is greatly extended when the chlorine concentration of an input stream is below about 0.05 ppm, and in certain highly chlorine-sensitive applications, the preferred chlorine concentration is nearly undetectable by conventional means (i.e., less than about 0.02 ppm). When chlorine is present, the chlorine concentration of first product stream 70 is inversely proportional to the residence time spent in irradiation unit 58. However, to provide a higher flowrate for medium to high volume applications, input stream 52 cannot be resident in irradiation unit 58 for an extended period of time. In this regard, the configuration of the present invention permits essentially total chlorine removal at an economically viable flowrate.

As noted, UV irradiation units are typically used in germicidal applications, as well as for ozone destruction and TOC removal from process streams. Consequently, manufacturers of these irradiation units typically use the residence time theoretically necessary for disinfection of microorganisms (i.e., germicidal residence time) as a basis for recommending acceptable residence times for TOC removal and ozone destruction. For example, a residence time of 10 times the germicidal residence time (10x) for TOC removal and 4x for ozone destruction in a low pressure 185 nm UV unit is recommended by Aquafine Corporation, Valencia, Calif. Depending on process parameters (e.g., input oxidizing agent concentration, choice of treatment unit 72, type of membrane downstream, and the like) and economic considerations, a liquid need only be resident in irradiation unit 58 for about 20x to substantially reduce the concentration of strong oxidizing agents. In other applications, economic considerations may require a residence time of about 10x or less. The unique configuration of the present invention allows substantially complete removal of strong oxidizing agents at these lower residence times.

As will be evident to those skilled in the art, in a fluidized multicomponent system, the residence time in a particular component will be a function of the component's volume as well as system flowrate. In a typical application, in which the volume of the irradiation unit is not varied during operation, residence time is an inverse function of system flowrate. Accordingly, equipment manufacturers typically provide a flow rate for disinfection. From the disinfection rate, one can calculate the flowrate necessary for a given application by dividing the disinfection rate by the recommended residence time. For example, if an irradiation unit has a disinfection rate of 100 gpm and an application calls for a residence time of 20x, flowrate through the unit should be 5 gpm (100/20). Flowrate through irradiation unit 58 can be controlled by conventional means, such as a spigot-type valve, Dole valve, or the like positioned downstream of irradiation unit 58, or by upstream pump 56.

Treatment unit 72 is capable of substantially reducing the concentration of strong oxidizing agents in first product stream 70 without introducing chemicals or heavy metal ions into the process and without providing sites for substantial bacteria growth. Treatment unit 72 can be chosen from the group consisting of a softener unit, a reaction vessel containing a bed of metal redox media, and combinations thereof. The selection of treatment unit 72 depends, in part, on the specific application or intended use of the product liquid (for example, analytical applications, pharmaceutical manufacturing, surgical irrigation, treatment of industrial effluent, and the like). The selection of treatment unit 72 will also depend on economic considerations regarding projected operating costs. As explained in detail below, softener units may require sodium brine regeneration and/or resin replacement.

In the past, softener units have primarily been used to reduce water hardness (calcium and/or magnesium content) prior to treatment with units containing membranes in order to reduce membrane fouling. Softener units typically contain beads that exchange two sodium ions for every calcium or magnesium ion removed from the "softened" water. This occurs because the cation exchange resin has a higher selectivity for "hardness ions" than the sodium ion; therefore for example, in the presence of magnesium the following reaction occurs (wherein R indicates a resin exchange site):

$$R_2-(Na^+)_2 + Mg^{++} \leftrightarrows R_2-Mg^{++} + 2Na^+$$

Although magnesium is shown in the example, the same reaction can occur with all divalent cations. The associated anion is not shown since it does not enter into the reaction. At some point before saturation is reached, the softener unit must be taken off-line and the resin returned to the predominately sodium form. The equilibrium reaction is reversed by using an excess of sodium, usually in the form of a brine regenerate.

However, strong oxidizing agents (chlorine in particular), adsorb onto the softener resin beads and, when present in sufficient concentration, will attack the polymer structure (i.e. backbone) of the resin. The lower the level of crosslinking of the polymer resin, the faster the degradation occurs. Because the degradation of softener resin by strong oxidizing agents is irreversible, the resin must eventually be replaced. Accordingly, in the past, removal of strong oxidizing agents by a softener unit has been prohibitively expensive. In fact, such removal typically takes place upstream of a softener unit to prevent pressure drop in the system due to the degradation of the softener resin beads and to prevent increased TOC concentrations downstream. In this regard, the configuration of the present invention does not extensively tax the resin beads of the softener unit. When used as treatment unit 72, a softener unit efficiently removes substantially all of the remaining strong oxidizing agent in first product stream 70, to produce third product stream 74 having a concentration of strong oxidizing agent within the preferred ranges defined above.

Either alternatively or in combination with a softener unit, treatment unit 72 can include a flow-through reaction vessel containing a bed of metal redox media. In this embodiment, as first product stream 70 flows through the bed of redox media, the liquid is in intimate contact with the media, thereby creating optimum conditions for spontaneous oxidation-reduction ("redox") reactions to take place between the media and the strong oxidizing agent. The natural by-products of these redox reactions are metal ions, which may be present in concentrations equal to the original concentration of strong oxidizing agent in the feedwater. Consequently, in certain sensitive applications, metal redox media cannot be used for primary removal of strong oxidizing agents. The configuration of the present invention, however, overcomes this shortcoming, in that second product stream 74 is not only substantially free of strong oxidizing agents but also substantially free of metal cations.

As known in the art, a redox reaction is an oxidizing chemical change, wherein an element's positive valence is increased (electron loss) accompanied by a simultaneous reduction of an associated element (electron gain). The relative tendencies of different species to be reduced or oxidized can be predicted from their standard potential ($E^0$) (potential relative to a standard hydrogen half cell using 1.0 molar solution at 25° C.). By comparing the $E^0$ values for different half-cell reactions, it is possible to determine whether a particular oxidation-reduction will spontaneously occur. For example, chlorine dissolved in water, having a pH of approximately 7 at 25° C., exists as HOCl and ClO$^-$, with HOCl predominating on the acid side and ClO$^-$ predominating on the base side. Assuming, for simplicity, that ClO$^-$ is the reacting species in an aqueous solution containing zinc or copper, the potentials for the zinc/chlorine and copper/chlorine redox reactions can be calculated as follows:

As shown above, both zinc and copper should each react spontaneously with hypochlorite, with the zinc/chlorine reaction theoretically being more spontaneous since it has the more positive potential. In practice, it has been found that zinc and copper alloy media, such as brass media, are more effective than pure zinc, pure copper, or a heterogeneous mixture thereof in the removal of dissolved chlorine. Furthermore, certain pure metals (e.g., zinc) can react violently in aqueous liquids, while brass does not. Because the redox reactions take place at or near the surface of the media, the media are preferably in the form of beads, granules, fibers, or the like, to increase useful surface area. A preferred media is KDF® 55 Coarse redox media, available from KDF Fluid Treatment, Inc., Three Rivers, Mich.

Other suitable reduction media include Raney metals, such as Raney copper and Raney nickel. As known to the skilled practitioner, Raney metals are formed by alloying a base metal (nickel, cobalt, copper, or other transition metals) with aluminum and then leaching the aluminum with a caustic. The product, a "spongy" metal with a large effective surface area, and the process for making the same was described by Raney, in U.S. Pat. No. 1,628,190, which is hereby incorporated by reference in its entirety herein.

If treatment unit 72 includes metal redox media and is the final serial system component, a valve 78 provides at least nominal back-pressure to the reaction vessel, thereby ensuring intimate contact between the treated liquid and substantially all surfaces of the media. In alternate embodiments, the present invention may further include treatment units (RO units, ultrafiltration units, ion exchange units, electrodeionization units, and the like) positioned downstream of treatment unit 72, which will provide the necessary back-pressure to the media bed.

Figure 3:
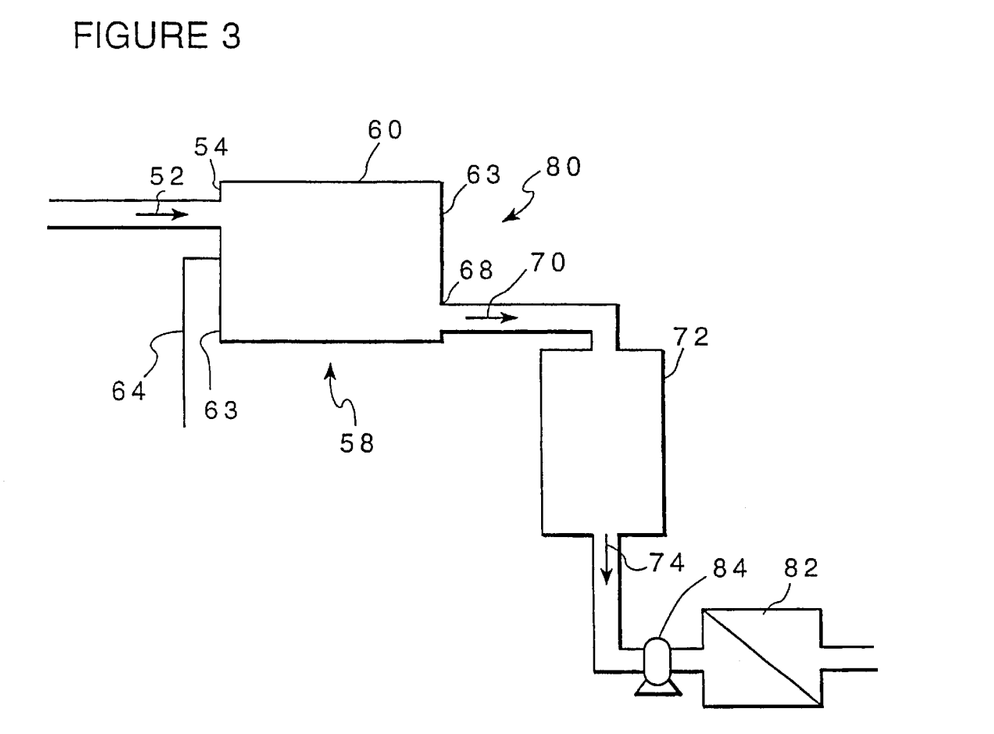
FIG. 3 is a schematic process flow diagram of a water treatment system according to another embodiment of the present invention.

One such alternative embodiment is depicted in FIG. 3, wherein a water treatment system 80 includes inlet 54 for receiving input stream 52 having a first chlorine concentration. Input stream 52 flows into irradiation unit 58, which emits UV radiation to substantially reduce the first chlorine concentration and forms first product stream 70 having a second chlorine concentration. Treatment unit 72 is provided in fluid communication with and positioned downstream of irradiation unit 58 to substantially reduce the second chlorine concentration, thereby forming second product stream 74 having a third chlorine concentration. Finally, an RO unit 82, in fluid communication with and positioned downstream of treatment unit 72 removes contaminants from second product stream 74 before the stream is directed to a point of use or storage (not shown). Although not shown, a double-pass configuration of RO units can be used to achieve high quality purified water. Optionally, system 80 can further include a polisher unit (not shown) to substantially remove any remaining contaminants from second product stream 74 before the product stream exits the system.

As known in the art, RO can remove nearly all contaminants from feedwater. The pore structure of RO membranes is such that practically all particles, bacteria, and organics greater than 300 Daltons MW are rejected. RO unit 82 typically contains at least one semi-permeable membrane and a pump 84 for providing hydraulic pressure across the membrane. This hydraulic pressure is applied to the concentrated (contaminated) solution to counteract and overcome the natural osmotic pressure across the membrane. In this manner, purified water is driven from the concentrated solution (feedwater) and collected downstream of the membrane.

RO also involves an ionic exclusion process. Only solvent is allowed to pass through the semi-permeable RO membrane, while virtually all ions and dissolved molecules are retained. The semi-permeable membrane rejects salts by a charge phenomena action. That is, the greater the charge, the greater the rejection. Therefore, the membrane is capable of rejecting nearly all strongly ionized polyvalent ions. Different feedwater may require different types of RO membranes. Membranes are commonly manufactured from cellulose acetate or thin-film composites of polyamide on a polysulfone substrate. Most RO membranes cannot tolerate the presence of strong oxidizing agents such as chlorine. Therefore, irradition unit 58 is provided in combination with treatment unit 72 to remove substantially all chlorine from the RO feed, resulting in longer membrane life which, in turn, results in more efficient system performance by reducing "down-time" for membrane replacement.

Further alternative embodiments can include an electrodeionization unit (not shown), either in addition to or in place of RO unit 82 to remove unwanted contaminants. Electrodeionization units suitable for use in the present invention include, for example, CDI® electrodeionization units, available from United States Filter Corporation, Palm Desert, Calif. As is well known, electrodeionization is also referred to as filled-cell electrodialysis and involves a process that effectively deionizes water, while the ion exchange resins positioned within the device are continuously regenerated. This electrochemical regeneration replaces the chemical regeneration of conventional ion exchange systems.

Although electrodeionization units are available in various configurations, such as a spiral design, a plate and frame design, and a circular design, each typically comprises a plurality of cells positioned between two electrodes. Each cell consists of a polymer frame onto which a cation permeable membrane and an anion permeable membrane are positioned on opposite sides. The space in the center of the cell, between the ion-selective membranes, is filled with a bed of ion exchange resins (e.g., cation exchange resins, anion exchange resins, or mixed bed). The cells are separated from one another typically by a screen-type separator.

The feedwater entering the electrodeionization unit is separated into at least three parts. A small percentage flows over the electrodes, a majority of the feed passes through the resin beds in the cells ("diluting compartments"), and the remainder passes along the separators between the cells ("concentrating compartments").

The ion exchange resins capture dissolved ions in the feedwater at the top of the cell. Electric current applied across the module pulls those ions through the ion selective membrane towards the electrodes. Cations are pulled through the cation permeable membrane towards the cathode, and anions through the anion selective membrane towards the anode. These ions, however, are unable to travel all the way to their respective electrodes since they come to the adjacent ion selective membrane which is of the same charge. This prevents further migrations of ions, which are then forced to concentrate in the concentrating compartments. The ions concentrated in these spaces between the cells are typically flushed out of the system to the drain.

As water passes through the resin beds in the diluting compartments, it is progressively deionized. At the lower end of the diluting compartments, where water is relatively free of ions, splitting of the water occurs in the electric field. This generates hydrogen and hydroxy ions which regenerate the ion exchange resins, effectively eliminating the need for chemical regeneration. Not only is an electrodeionization unit relatively inexpensive to operate, it removes dissolved inorganics (such as carbon dioxide, boron, and ammonia) effectively.

The present invention will be further illustrated by the following examples, which are intended to be illustrative in nature and are not to be construed as limiting the scope of the invention.

EXAMPLE

To determine the effectiveness of the present invention in removing chlorine from an aqueous stream, dechlorination data were produced using an UV irradiation unit upstream of a softener unit. The test system included a variable in-line pump positioned downstream of a feedwater storage tank. An AQUIONICS® model UV-V-2.5B medium pressure 185 nm UV irradiation unit, available from Aquionics, Inc., Erlanger, Ky., was positioned downstream of the pump. The manufacturer's recommended residence time for disinfection (i.e. 1×) was 105 gpm. The softener unit was positioned immediately downstream of the irradiation unit and included cation exchange resin beads in the sodium form. A flow meter was positioned downstream of the irradiation unit to monitor system flowrate.

The feedwater was prepared from municipal water obtained in Lowell, Mass. The municipality uses softeners to treat its water supply. However, for control purposes, the municipal water was passed through a bed of granulated activated carbon and a USF™ FCDPF1001 1 $\mu$m cartridge filter, commercially available from United States Filter Corporation, Palm Desert, Calif. A stock solution containing sodium hypochlorite was prepared from 5.25% commercial bleach solution (1 liter bleach/9 liters water). The stock solution was introduced into the feedstream as necessary to provide predetermined chlorine concentrations in the feedwater with a LMI™ A371-150FS metering pump, available from Liquid Metronics Division of Milton Roy, Inc., Acton, Mass. The chlorine concentration was varied by varying the metering pump's stroke, while the pump's speed was maintained at maximum. An inline static mixer was positioned downstream of the metering pump and upstream of the irradiation unit to ensure a homogeneous input.

The irradiation unit had a manufacturer's recommended germicidal flowrate of 105 gpm, which corresponded to a residence time of 1×. During the test runs, the flowrate and input chlorine concentration were varied to evaluate the performance of the system in various applications.

After a 24 hour "break in" period for the UV lamp, chlorine concentration measurements were taken at three points in the system: the inlet and the outlet of the irradiation unit and the outlet of the softener unit. HACH™ DR2000 spectrometers with N,N-diethyl-p-phenylenediamine (DPD) powder pillows, both available from Hach, Inc., Loveland, Colo., were used for chlorine analysis. The spectrometers had a least count of 0.01 ppm, with an accuracy rating of ±0.02 ppm. When necessary, chlorine analysis was accomplished by HACH™ ultra-low chemical detection method #86, having a least count of 0.001 ppm and an accuracy rating of ±0.004 ppm.

Table 1 below shows the chlorine concentrations at the outlets of the softener and irradiation units as a function of inlet chlorine concentration and flow rate. The table contains data from 6 discrete sets of operating conditions. Flow rates were maintained at predetermined values ranging from 2.5 gpm to 12.5 gpm. At each flow rate, the input chlorine concentration to the irradiation unit was maintained at a predetermined value between 0.30 and 1.50 ppm, and the outlet chlorine concentrations of the irradiation and softener units were measured for each set of conditions.

TABLE 1

| Run Number | Flow Rate (gpm) | UV Inlet Concentration (ppm) | UV Outlet Concentration (ppm) | Softener Outlet Concentration (ppm) |
|---|---|---|---|---|
| 1 | 2.5 | 0.48 | 0.04 | 0.00 |
| 2 | 5.0 | 0.30 | 0.06 | 0.00 |
| 3 | 5.0 | 0.48 | 0.08 | 0.01 |
| 4 | 5.0 | 0.50 | 0.10 | 0.01 |
| 5 | 5.0 | 1.50 | 0.26 | 0.01 |
| 6 | 12.5 | 0.95 | 0.22 | 0.01 |

The data compiled from the six test runs show that the present invention is capable of consistently removing essentially all chlorine from the input stream. Comparing Runs 1 and 3 shows that chlorine removal by UV alone generally decreases (i.e., 0.04 ppm to 0.08 ppm) as flow rate increases (i.e., 2.5 gpm to 5.0 gpm). Comparing Runs 2 and 5 shows that dechlorination by UV alone becomes increasingly ineffective (i.e., 0.06 ppm to 0.26 ppm) as the input chlorine concentration increases (i.e., 0.30 ppm to 1.50 ppm). Chlorine removal by the combination of UV and softener, however, is consistently effective (i.e. 0.00 ppm to 0.01 ppm) notwithstanding the variations in input concentration. In fact, Run Number 5 shows that, even when UV inlet chlorine concentration exceeds that of municipal drinking water supplies (e.g., 1.5 ppm), outlet chlorine concentration at the softener is nearly undetectable (i.e., 0.01 ppm). Likewise, Run Number 6 shows that the present invention can essentially completely (i.e., 0.01 ppm) remove a substantial concentration of chlorine (i.e., 0.6 ppm) at higher flowrates (i.e., 12.5 gpm).

It will be understood that each of the elements described above, or two or more together, may also find utility in other applications differing from those described above. For example, other conventional water treatment methods may be used in conjunction with the present invention as dictated by specific system requirements. Such methods may include, for example, ultrafiltration and ozonation, as well as the addition of divert valving and/or recycle loops to any of the units described herein. While the invention has been illustrated and described as embodied in an apparatus and process for removing strong oxidizing agents from a liquid, it is not intended to be limited to the details shown, since various modifications and substitutions may be made without departing in any way from the spirit of the present invention.

Further modifications and equivalents of the invention herein disclosed will occur to persons skilled in the art using no more than routine experimentation, and all such modifications and equivalents are believed to be within the spirit and scope of the invention as defined by the following claims.

What is claimed is:

1. A process for treating water, said process comprising the steps of:
   providing an input stream having a first chlorine concentration of between about 0.95 ppm and about 1.50 ppm;
   irradiating the input stream with an ultraviolet unit to reduce the first chlorine concentration by about 76% to about 82%, thereby forming a first product stream having a second chlorine concentration; and
   passing the first product stream through a softener unit in fluid communication with and positioned downstream of the ultraviolet unit for substantially reducing the second chlorine concentration, thereby forming a second product stream having a third chlorine concentration.

2. The process of claim 1, wherein the input stream is resident in the ultraviolet unit for a period of time less than about 20×.

3. The process of claim 2, wherein the input stream is resident in the ultraviolet unit for a period of time less than about 10×.

4. The process of claim 1, wherein the softener unit contains ion exchange resin in sodium form.

5. The process of claim 1, further comprising the step of providing a reaction vessel containing an anion exchange resin in fluid communication with and positioned downstream of the softener unit for removing unwanted contaminants from the second product stream.

6. The process of claim 5, wherein the reaction vessel is a continuous electrodeionization unit.

7. The process of claim 1, further comprising the step of providing a reverse osmosis unit in fluid communication with and positioned downstream of the softener unit for removing unwanted contaminants from the second product stream.

8. A process for treating water, said process comprising the steps of:
   providing an input stream having a first chlorine concentration of between about 0.95 ppm and about 1.50 ppm;
   irradiating the input stream with an ultraviolet unit to reduce the first chlorine concentration by about 76% to about 82%, thereby forming a first product stream having a second chlorine concentration; and
   passing the first product stream through a softener unit in fluid communication with and positioned downstream of the ultraviolet unit for substantially reducing the second chlorine concentration, thereby forming a second product stream having a third chlorine concentration,
   wherein the third chlorine concentration is less than about 0.05 ppm.

9. The process of claim 8, wherein the first chlorine concentration is about 1 ppm.

10. The process of claim 8, wherein the third chlorine concentration is less than about 0.02 ppm.

11. The process of claim 10, wherein the third chlorine concentration is less than about 0.01 ppm.

12. The process of claim 8, wherein the softener unit contains ion exchange resin in sodium form.

13. The process of claim 8, further comprising the step of providing a reaction vessel containing an anion exchange resin in fluid communication with and positioned downstream of the softener unit for removing unwanted contaminants from the second product stream.

14. The process of claim 13, wherein the reaction vessel is a continuous electrodeionization unit.

15. The process of claim 8, further comprising the step of providing a reverse osmosis unit in fluid communication with and positioned downstream of the treatment unit for removing unwanted contaminants from the second product stream.

16. A process for treating water, said process comprising the steps of:

providing an input stream having a first chlorine concentration of about 0.95 ppm and about 1.50 ppm;

irradiating the input stream in an ultraviolet unit wherein the input stream has a residence time in the ultraviolet unit less than about 20×, thereby forming a first product stream having a second chlorine concentration; and passing the first product stream through a softener unit in fluid communication with and positioned downstream of the irradiation unit for substantially reducing the second chlorine concentration, thereby forming a second product stream having a third chlorine concentration, wherein the third chlorine concentration is less than about 0.05 ppm.

17. The process of claim 16, wherein the residence time is less than 10×.

18. The process of claim 17, wherein the residence time is about 8.4×.

* * * * *